US008256704B2

(12) United States Patent
Lundgren

(10) Patent No.: US 8,256,704 B2
(45) Date of Patent: Sep. 4, 2012

(54) VERTICAL/SHORT TAKE-OFF AND LANDING AIRCRAFT

(75) Inventor: Gert Lundgren, San Diego, CA (US)

(73) Assignee: LAPCAD Engineering, Inc., San Diego, CA (US)

( * ) Notice: Subject to any disclaimer, the term of this patent is extended or adjusted under 35 U.S.C. 154(b) by 1021 days.

(21) Appl. No.: 11/838,731

(22) Filed: Aug. 14, 2007

(65) Prior Publication Data

US 2009/0045295 A1 Feb. 19, 2009

(51) Int. Cl.
*B64C 27/22* (2006.01)
(52) U.S. Cl. .......................................... 244/7 C
(58) Field of Classification Search ............... 244/12.3, 244/12.4, 23 B, 23 D, 6, 7 C, 58, 56
See application file for complete search history.

(56) References Cited

U.S. PATENT DOCUMENTS

| 3,049,320 | A | * | 8/1962 | Fletcher | 244/12.4 |
| 5,150,857 | A | | 9/1992 | Moffitt | |
| 5,381,985 | A | | 1/1995 | Wechsler | |
| 5,758,844 | A | * | 6/1998 | Cummings | 244/7 C |
| 6,293,492 | B1 | | 9/2001 | Yanagisawa | |
| 6,343,768 | B1 | * | 2/2002 | Muldoon | 244/7 R |
| 6,347,764 | B1 | | 2/2002 | Brandon | |
| 6,460,802 | B1 | | 10/2002 | Norris | |
| 6,691,949 | B2 | | 2/2004 | Plump | |
| 7,143,973 | B2 | * | 12/2006 | Ballew | 244/6 |
| 7,584,923 | B2 | * | 9/2009 | Burrage | 244/7 R |
| 2005/0127238 | A1 | * | 6/2005 | Ballew | 244/10 |

FOREIGN PATENT DOCUMENTS

WO W02006/022654 A 3/2006

OTHER PUBLICATIONS

Guthrey et al: "draft-guthrey-ip7816-01: IP and ARP over ISO 7816", Network Working Group Internet Draft, Jan. 2001, pp. 1-8, XP002317969, the whole document.
Urien P: "Internet Card, a smart card as a true Internet node", Computer Communications, Elsevier Science Publishers BV, Amsterdam, NL, vol. 23 No. 17, Nov. 1, 2000, pp. 1655-1666, XP004238469 ISSN: 0140-3664, the whole document.

* cited by examiner

*Primary Examiner* — Tien Dinh
*Assistant Examiner* — Valentina Xavier
(74) *Attorney, Agent, or Firm* — The Jansson Firm; Pehr B. Jansson

(57) ABSTRACT

A vertical/short take-off and landing aircraft with a single proprotor assembly that has a pair of inline counter-rotating rotors. Two inline counter-rotating engines are directly connected to the rotors. One engine is shut down in horizontal flight to improve efficiency. Gimbal mounting the proprotor assembly permits thrust to be directed forward to back and left to right to control pitch and roll when hovering. Varying the relative engine speeds controls yaw. The aircraft is adaptable as an unmanned vehicle.

21 Claims, 9 Drawing Sheets

VERTICAL/SHORT TAKE-OFF AND LANDING AIRCRAFT

TECHNICAL FIELD

The present invention relates generally to Vertical/Short Take-off and Landing aircraft and more particularly to a tilt-rotor or tilt-wing aircraft with one engine nacelle assembly that includes two inline gimbal mounted counter-rotating propellers.

BACKGROUND OF THE INVENTION

Vertical/Short Take-Off and Landing (V/STOL) aircraft are fixed-wing aircraft that can lift off from the ground and land in a vertical hover, and transition from the vertical hover mode to a horizontal flight mode and back to vertical hover mode. Configurations have included several unsuccessful experimental variants of tailsitter aircraft that launch and land on their tails, vectored-thrust aircraft like the highly successful British AV8B Harrier now built by Boeing Integrated Defense Systems of St. Louis, Mo., a subsidiary of The Boeing Company, Chicago, Ill., and the F-35B Joint Strike Fighter from Lockheed-Martin of Ft. Worth, Tex., that direct the thrust from a jet engine downward to hover and rearward for horizontal flight, and tilt-wing/tilt-rotor aircraft like the V-22 Osprey jointly from Bell Helicopter of Ft. Worth, Tex. and Boeing Integrated Defense Systems of St. Louis, Miss., a subsidiary of The Boeing Company, Chicago, Ill., that directs thrust from two rotatable proprotor assemblies situated in engine nacelles on the ends of the main wing. With tilt-wing aircraft, the entire wing, elevator, and rotor assemblies rotate, resulting in reduced drag in vertical hover mode. With tilt-rotor aircraft, primarily the proprotor/engine nacelle assemblies rotate. In other aspects of flight control and performance, tilt-wing aircraft are essentially the same as tilt-rotor aircraft and, unless the features of tilt-wing aircraft are specifically mentioned, all references to tilt-rotor aircraft herein will apply equally to both tilt-rotor aircraft and tilt-wing aircraft.

Although there have been experimental tilt-rotor aircraft with four proprotor/engine nacelles situated with two proprotor/engine nacelles situated on a small forward wing and two on a small back wing (e.g., the Bell X-22), typical tilt-rotor aircraft like the V-22 Osprey are configured with two proprotor/engine nacelles situated at the end of the main wing. In this configuration, the proprotors are counter-rotating (rotating in opposite directions) to cancel torque between the proprotors. In this configuration, the length of the wing is dictated by the size of the proprotors required to generate the necessary lift. U.S. Pat. No. 5,381,985 to Wechsler et al., Wingtip Mounted Counter-Rotating Proprotor for Tiltwing Aircraft, (Wechsler) discloses a configuration where each proprotor consists of a pair of inline counter-rotating rotors. This permits smaller diameter proprotors that generate the same lift as a single larger rotor, permitting employment of a smaller wing. Additionally, with two rotors in each proprotor, the blade loading on each individual blade is reduced. Tilt-rotor aircraft with only one proprotor are less common. U.S. Pat. No. 6,343,768 to Muldoon, Vertical/Short Take-Off and Landing Aircraft, (Muldoon) discloses a single rotor assembly with a pair of inline counter-rotating rotors situated at the center of the aircraft.

Tilt-rotor aircraft can typically perform in any of three modes: Conventional Take-Off and Landing (CTOL), Short Take-Off and Landing (STOL) or Vertical Take-Off and Landing (VTOL). In Conventional Take-Off and Landing, the proprotors, propellers, or rotors are in a horizontal position, with thrust directed backward, and the aircraft takes of and lands like conventional fixed-wing aircraft, with similar take-off and landing distances. In Short Take-Off and Landing, the nacelles connected to the proprotors, propellers or rotors are angled slightly upward from the horizontal position to direct thrust down and to the rear, leading to shorter take-off and landing distances. In both Conventional and Short Take-Off and Landing the familiar flight controls used by conventional fixed-wing aircraft are employed: horizontal stabilizer for pitch, vertical rudder for yaw, ailerons for roll and wing flaps for take-off and landing. These flight controls rely on the flow of air over the wings (from the horizontal movement of the aircraft) to generate the forces necessary to pitch, roll or yaw the aircraft.

In Vertical Take-Off and Landing the tilt-rotor/tilt-wing aircraft proprotors, propellers, or rotors are in a vertical position, directing thrust downward and giving the tilt-rotor the ability to take-off and land vertically. In this configuration, however, the absence of horizontal motion means that the conventional fixed-wing aircraft control surfaces are useless to control the pitch, roll or yaw of the aircraft. Therefore, in the Vertical Take-Off and Landing mode, the tilt-rotor/tilt-wing aircraft must employ alternative methods of flight control. In one variant, the tilt-rotor/tilt-wing aircraft employs an ability of the nacelles connected to the rotors, propellers, or proprotors to move independently of each other in combination with a variable-pitch proprotor, propeller, or rotor to control flight. The variable-pitch proprotor, propeller, or rotor uses a mechanism to control the pitch of the rotor, propeller, or proprotor blades similar to the variable-pitch propeller mechanism used by conventional fixed wing aircraft. In this case, rotating the nacelles in tandem controls aircraft pitch, such that a slight forward rotation of the nacelles will move the aircraft forward and pitch the aircraft nose down and a slight rearward rotation of the nacelles will move the aircraft rearward and pitch the aircraft nose up. Adjusting the rotor blade pitch of one rotor with respect to the other rotor controls roll by causing one rotor to generate more thrust than the other. Rotating one nacelle forward and the other rearward controls yaw. Using the variable-pitch mechanism means having a moderately complex mechanism at the nacelles connected to the propeller, rotor or proprotor, but a more complex scheme of rotating the nacelles independently.

In another variant, each proprotor or rotor employs a swashplate assembly that permits cyclic and collective blade pitch control similar to a helicopter rotor. Here, forward or rearward cyclic inputs to both proprotors/rotors in tandem controls pitch while applying forward and rearward cyclic input to opposite proprotors/rotors provides yaw control. Adjusting the collective blade pitch of one proprotor/rotor with respect to the other proprotor/rotor controls roll by causing one proprotor/rotor to generate more thrust than the other. This variant simplifies the yaw control by eliminating the need to control the nacelles connected to the proprotor/rotor independently but adds the more complex blade pitch control mechanism, the swashplate. This is the system employed in the Wechsler disclosure.

In single nacelle configurations like the Muldoon disclosure, yaw can not be controlled with collective and cyclic pitch of two propellers, rotors or proprotors. Therefore, Muldoon shows "a series of control surfaces located in the rotor wash" to control yaw (Muldoon, Abstract) in addition to collective and cyclic pitch mechanism on the nacelle assembly for pitch and roll control. In all of the above mentioned configurations, the vertical hover mode requires complex control mechanisms for pitch, roll and yaw control.

Introduction of inline counter-rotating rotors, propellers or proprotors adds complexity because some form of transmission is required to translate the rotation of the engine to the counter-rotation of two rotors, propellers or proprotors. Additionally, two-nacelle configurations like the V-22 Osprey and Wechsler typically employ a transfer case mechanism to provide power to both proprotors, propellers or rotors in the case of an engine failure.

In horizontal flight mode, less power is typically required from the proprotors because the proprotors are freed from the need to generate lift. In horizontal flight mode, lift is generated by the airflow over the wings. For this reason, Muldoon discloses a braking mechanism in the transmission that stops the rotation of one of the proprotors, channeling all the power in to only one proprotor. This improvement in efficiency comes at the cost of an added complexity in the brake mechanism.

Because of all of the complex flight control mechanisms described above, it is not uncommon to implement a fly-by-wire flight control system, as is done on the V-22 Osprey. Such a system must itself be highly complex to smoothly control the conversion from vertical hover mode to horizontal flight mode and the reconversion back to vertical hover mode.

Because of the complexity of the prior art V/STOL aircraft, V/STOL advantages have been realized nearly exclusively by large, complex aircraft. From the foregoing it will be apparent that there is a need for improved flight controls on a tilt-wing/tilt-rotor aircraft when in vertical hover mode that involves less complex mechanisms and is therefore cheaper and more amenable to use on small commercial and private aircraft. Further, it will be apparent that there is a need for a simple mechanism for employing inline counter-rotating propellers, rotors, or proprotors on a tilt-wing/tilt-rotor aircraft. It will also be apparent that there is a need for a simple mechanism for stopping the rotation of one such propeller, rotor or proprotor of an a pair of inline counter-rotating propellers, rotors, or proprotors in horizontal flight mode to improve efficiency. Finally, it will be apparent that a simplified automatic flight control mechanism is needed.

SUMMARY OF THE INVENTION

In a preferred embodiment, a pair of inline counter-rotating propellers are employed on a V/STOL aircraft that does not require a transmission to create the counter rotation of the individual propellers. Additionally, a preferred embodiment provides a simple mechanism for stopping the rotation of one propellers of an inline counter-rotating propeller assembly for improved efficiency in horizontal flight mode. A V/STOL aircraft embodying the invention is simple to build and maintain and is adaptable to either piloted or unpiloted applications, providing benefits to aircraft of all scales and sizes. Furthermore, two engines improve aircraft safety during both horizontal flight mode and vertical hover mode. In horizontal flight mode, loss of power from one engine will not require re-trimming of the aircraft because the engines are mounted inline. In vertical hover mode, loss of one engine will still allow the remaining engine to maintain a survivable rate of descent. The improvements described herein are applicable to tilt-wing aircraft and tilt-rotor/tilt-propeller aircraft with simplified flight controls for vertical hover mode. Herein after, references to tilt-rotor/tilt-propeller aircraft apply equally to tilt-wing aircraft (the term V/STOL aircraft is used herein to refer to either).

In one embodiment of the invention, a V/STOL aircraft employs a single engine nacelle connected to a pair of inline counter-rotating propellers and a pair of inline counter-rotating engines, where each of the propellers is directly driven by one of the engines. This simplified arrangement reduces the complexity of inline counter-rotating proprotor, propeller, and rotor systems by eliminating the need for a transmission. In addition, in this arrangement, it is easy to simply shut down one engine and only fly in horizontal flight mode with one propeller engaged.

In another embodiment, the engine nacelle is mounted such that, when in vertical hover mode, the engine nacelle is rotatable about the longitudinal axis of the aircraft, providing the ability to direct thrust downward and to the right or downward and to the left. Varying the direction of the engine nacelle from left to right thereby provides roll control of the aircraft. Varying the direction of the engine nacelle from front to back provides pitch control of the aircraft, and is accomplished through the same mechanism used to rotate the engine nacelle from vertical to horizontal and back for conversion from vertical hover mode to horizontal flight mode and reconversion back to vertical hover mode. This arrangement eliminates the need for a complex collective and cyclic blade pitch assembly.

In another embodiment of the present invention, the relative speed of the inline counter-rotating engines is varied to control yaw in vertical hover mode. In this case, under normal operating conditions, both engines turn at the same speed and the torque produced by the first engine and blade is equal to the to the torque produced by the second engine and blade, but in the opposite direction, so the combined torque on the tilt-rotor aircraft is zero. Also, each engine and blade produces half of the total thrust. When the speed of one engine is increased and the speed of the other engine is decreased by the same amount, the resulting non-zero net torque results in yaw of the aircraft with no net change in the thrust produced by the pair of propellers. With this arrangement, there is no need for additional control surfaces situated in the prop wash to control yaw. A further embodiment includes electric motors as an alternative to internal combustion engines, to drive the propellers. This provides for easier control of relative motor speed and provides quicker yaw response.

An additional embodiment of the invention incorporates an automatic feedback control mechanism for stabilizing flight characteristics of the V/STOL aircraft when in vertical hover mode.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
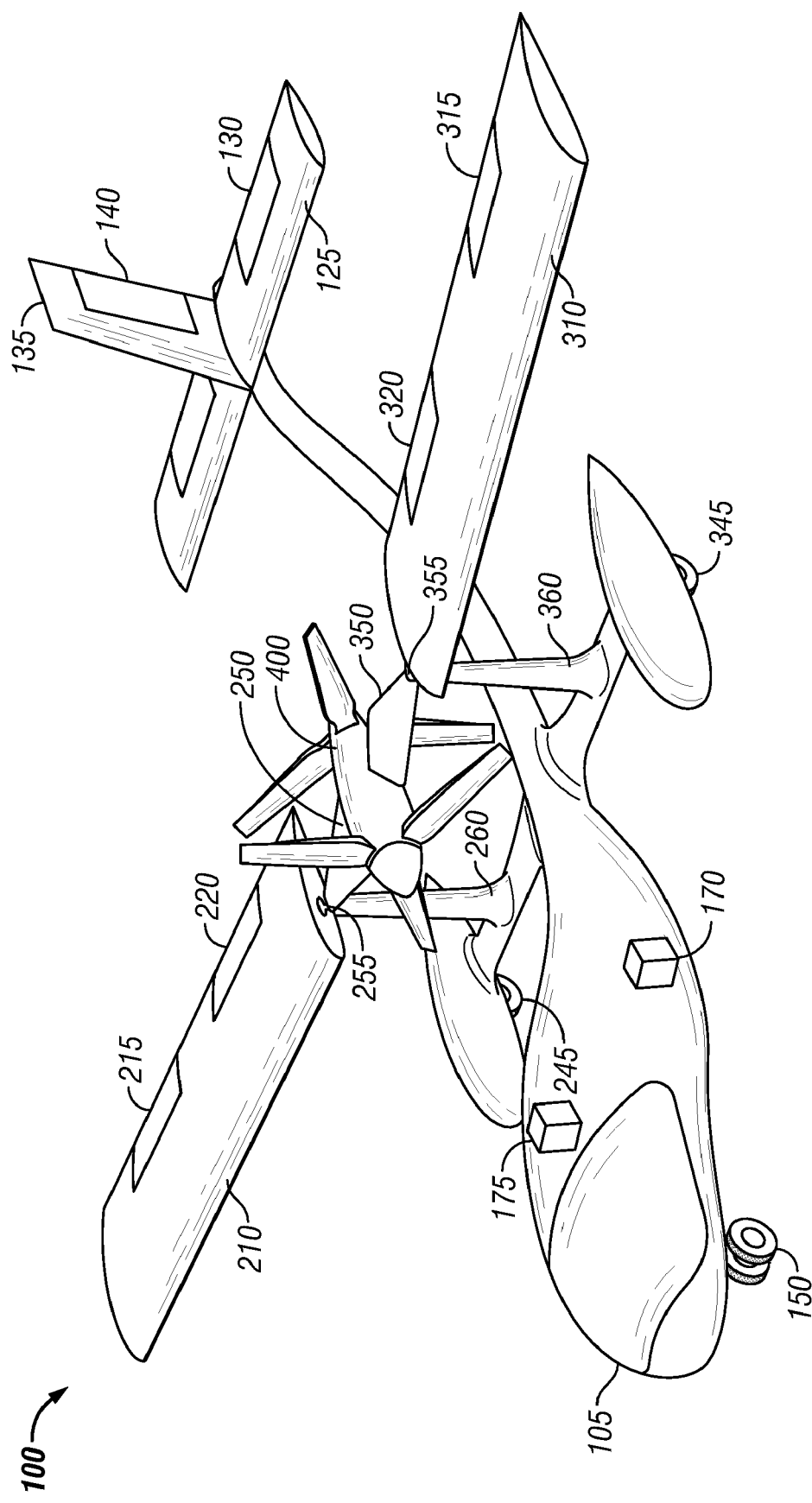
FIG. 1 is a perspective view of one embodiment of a tilt-rotor/tilt-propeller aircraft in horizontal flight mode.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Introduction

The drawings show for purposes of illustration, a V/STOL aircraft with a single central engine nacelle connected to a pair of inline counter-rotating propellers. Such a V/STOL aircraft may directly connect each of the propellers to one of a pair of inline counter-rotating engines, providing a simplified mechanism that does not require a transmission to create the counter-rotation of the propellers.

Additionally, by shutting down one of the inline counter-rotating engines in horizontal flight mode, this configuration improves efficiency of the aircraft in horizontal flight mode. By mounting the engine nacelle in such a way that the engine nacelle can be rotated about the longitudinal axis and by independent engine speed control, a simplified flight control system for vertical hover mode may be achieved. In an additional embodiment, a simplified flight stabilization system is applied to the flight control system. Also, in another embodiment, the flight control system is operated by remote control.

Figure 2:
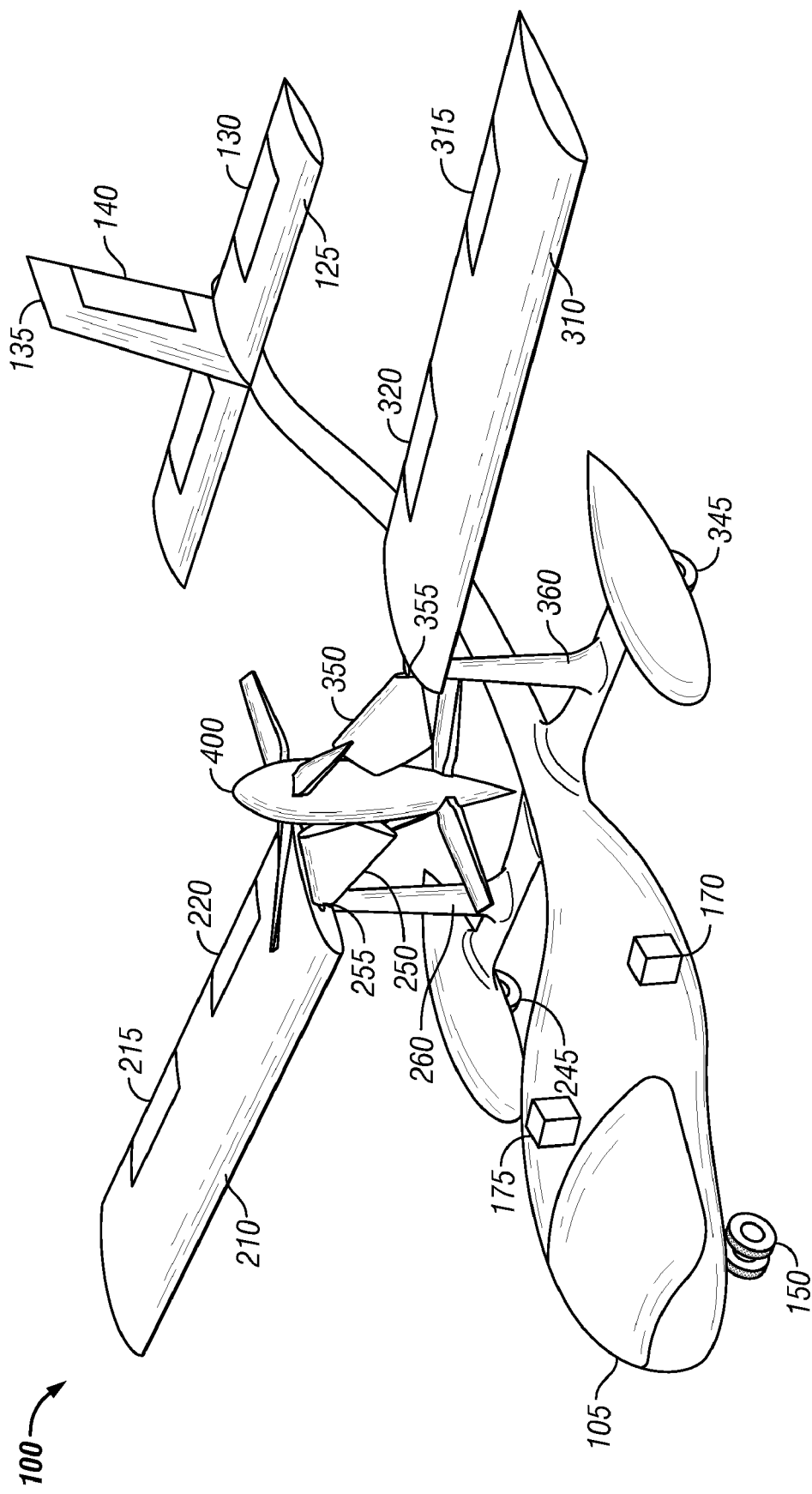
FIG. 2 is a perspective view of the tilt-rotor/tilt-propeller aircraft of FIG. 1 in vertical hover mode.

FIG. 1 shows a perspective view of a tilt-rotor/tilt-prop aircraft (referred to generally as 100) in horizontal flight mode according one embodiment of the invention. In horizontal flight mode, the tilt-rotor/tilt-prop aircraft 100 performs similarly to a regular fixed wing aircraft. The thrust assembly 400 is in a horizontal position, directing thrust backward, which drives the tilt-rotor/tilt-prop aircraft 100 forward. The motion of the wings 210 and 310 through the air provides the lift that keeps the tilt-rotor/tilt-prop aircraft 100 airborne. The horizontal flight mode is very efficient for traversing from one point to another, because the thrust assembly 400 only needs to provide enough power to keep the tilt-rotor aircraft 100 moving forward fast enough to maintain sufficient lift to remain airborne. Flight control may be achieved by engaging the elevator 130 at the trailing edge of the horizontal stabilizer 125 to control pitch, ailerons 215 and 315 at the trailing edge of the wings 210 and 310 to control roll, a rudder 140 at the trailing edge of the vertical stabilizer 135 to control yaw, and landing flaps 220 and 320 for additional lift at slow speeds. For take-off in horizontal flight mode, the tilt-rotor/tilt-prop aircraft 100 rolls on landing gear 150, 245 and 345, down a runway, accelerating to the speed where the lift generated by the wings 210 and 310 is sufficient to overcome gravity. Depending on the size and weight of the tilt-rotor/tilt-prop aircraft 100, the distance required to get airborne can be significant (commercial runways can exceed 8,000 feet). Landing in horizontal flight mode involves a similar amount of runway as take-off FIG. 2 shows the tilt-rotor/tilt-prop aircraft 100 from FIG. 1 in vertical hover mode. In vertical hover mode, the thrust assembly 400 is in a vertical position, directing thrust downward and generating the lift necessary to get the tilt-rotor aircraft 100 airborne. The thrust assembly 400 transitions from the horizontal position of horizontal flight mode to the vertical position of vertical hover mode by rotating about a lateral axis. This is accomplished by suspending the thrust assembly 400 between the wings 210 and 310 by two nacelle support spars 250 and 350, which in turn attach to two lateral pivot points 255 and 355. Rotation is accomplished through nacelle lateral rotator motor 265 that operates to turn the thurst assembly 400 in the pivot points 255 and 355. The vertical hover mode is beneficial because a tilt-rotor/tilt-prop aircraft in vertical hover mode can take off straight upward and land straight downward, eliminating any need for a runway. Also, in vertical hover mode, a tilt-rotor/tilt-prop aircraft can hover in one place like a helicopter.

Unlike a helicopter, however, the tilt-rotor/tilt-prop aircraft 100 does not have a tail rotor to compensate for the torque created by the main rotor. To compensate for torque, typical tilt-rotor aircraft such as the Bell-Boeing V-22 Osprey employ two proprotor/engine nacelles, one at each wingtip, and the proprotors are rotating in opposite directions (i.e., counter-rotating). U.S. Pat. No 6,343,768 to Muldoon, Vertical/Short Take-Off and Landing Aircraft (Muldoon) discloses single, centrally located proprotor. To compensate for torque, Muldoon discloses that the single, centrally located proprotor consists of two inline counter-rotating rotors. However, the rotors are powered by engines through a transmission that translates engine rotation through a ninety-degree angle into the counter-rotation of the rotors. Such a transmission robs a significant amount of engine power from the rotors.

Figure 3:
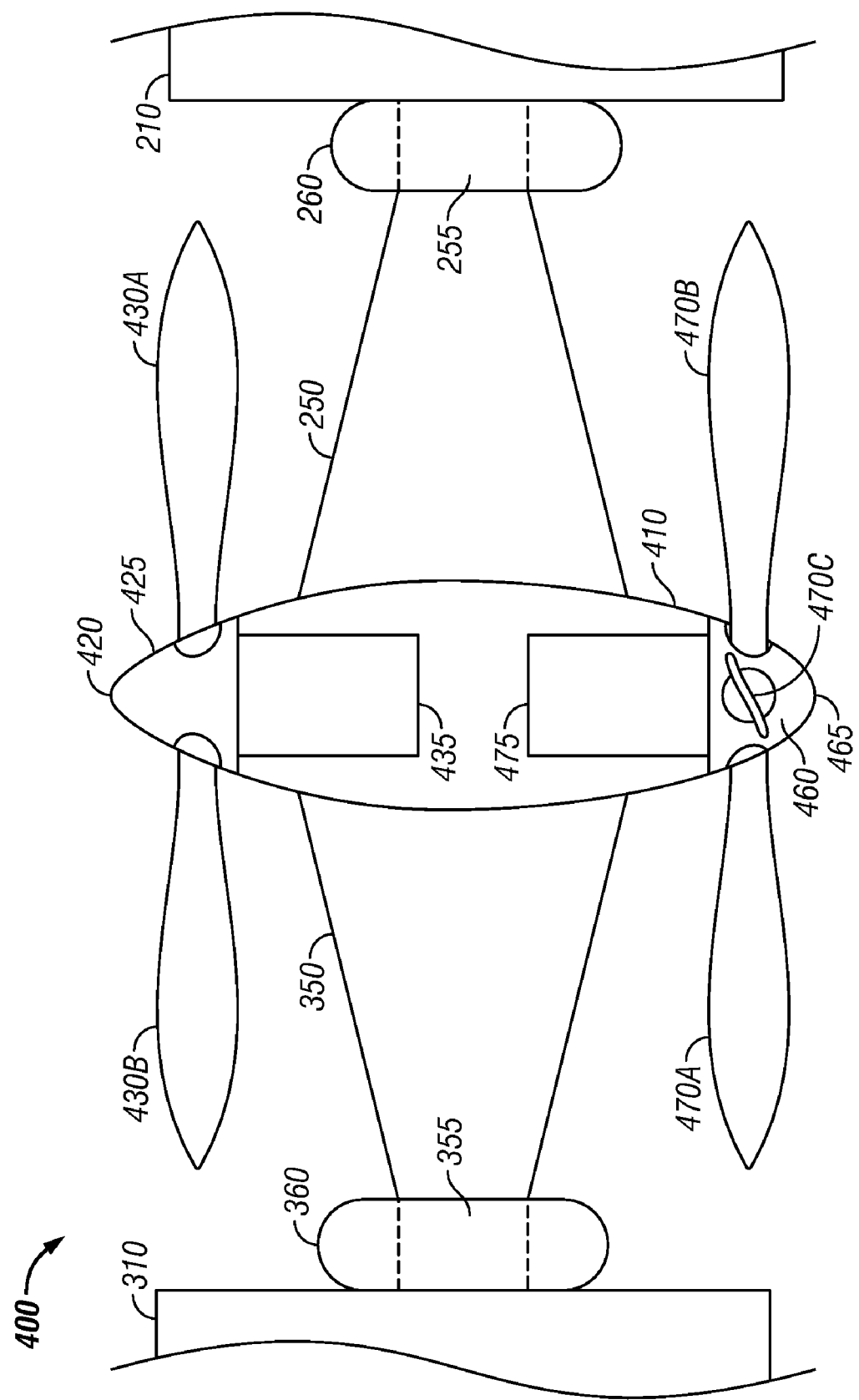
FIG. 3 is a top view of a engine nacelle rigidly fixed to support members on the tilt-rotor/tilt-propeller aircraft of FIG. 1 in horizontal flight mode according to the invention.
Figure 4:
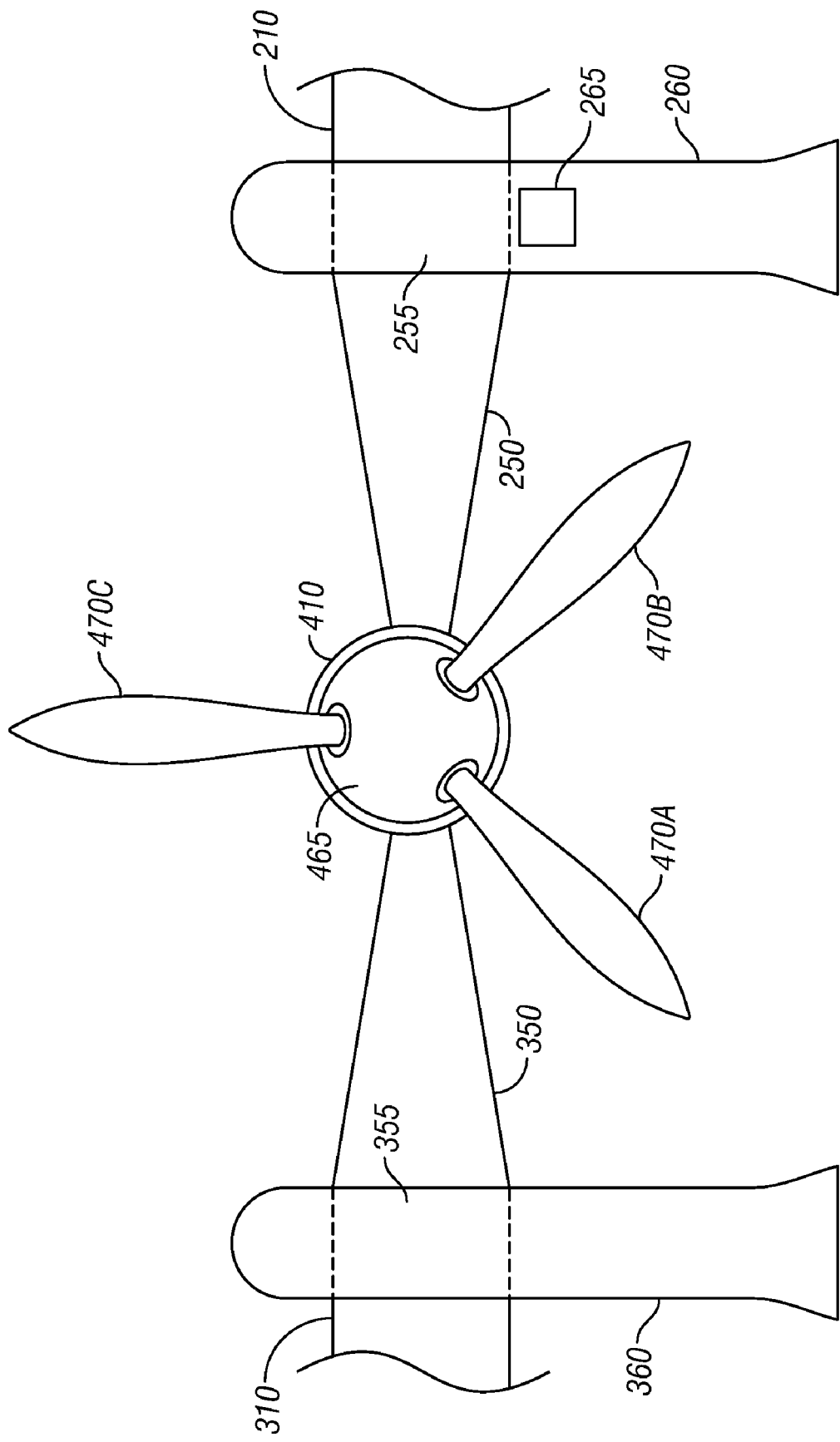
FIG. 4 is a rear view of a engine nacelle rigidly fixed to support members on the tilt-rotor/tilt-propeller aircraft of FIG. 1 in horizontal flight mode according to the invention.

FIGS. 3 and 4 show the top and rear view of the thrust assembly 400, respectively, in horizontal flight mode, according to one embodiment of the present invention. Here, the right nacelle support spar 250 and the left nacelle support spar 350 rigidly attach to the nacelle 410. The nacelle 410 supports two inline propeller assemblies, a forward propeller assembly 420 and an aft propeller assembly 460, and two inline counter-rotating engines, a forward engine 435 and an aft engine 475. Here, further, the forward propeller assembly 420 is directly connected to the forward engine 435, and the aft propeller assembly 460 is directly connected to the aft engine 475. This configuration eliminates the inefficiency associated with a transmission, leaving more engine power available to the propeller assemblies 420 and 460. Further improvement in engine efficiency is realized an embodiment where one of the two motors 435 and 475 is shut down in horizontal flight mode. In the alternative, the two inline counter-rotating engines 435 and 475 are connected to the propeller assemblies 420 and 460 through reduction gears.

In the vertical hover mode, the wings 210 and 310 do not provide any lift, and the control surfaces used in horizontal flight mode (the horizontal flaps 130, ailerons 215 and 315, rudder 140 and landing flaps 220 and 320) do not provide any control of pitch, roll, yaw or lift. Therefore, some other mechanism for control is required in vertical hover mode.

In one embodiment of the present invention, a conventional cyclic pitch mechanism (e.g. a swashplate), is employed to control pitch and roll of the tilt-rotor aircraft 100 in vertical hover mode. Yaw control is through control of the relative speeds of the inline counter-rotating motors 435 and 475. In this embodiment, a difference in speed between the motors creates an imbalance in the torque produced by each motor 435 and 475 and assembly 420 and 460 (in the case of this alternative embodiment, assemblies 420 and 460 are rotor assemblies), respectively, which causes the tilt-rotor aircraft 100 to rotate in the horizontal plane (i.e. to yaw). This embodiment eliminates the need for deflectors located in the prop wash of the rotors.

Figure 5:
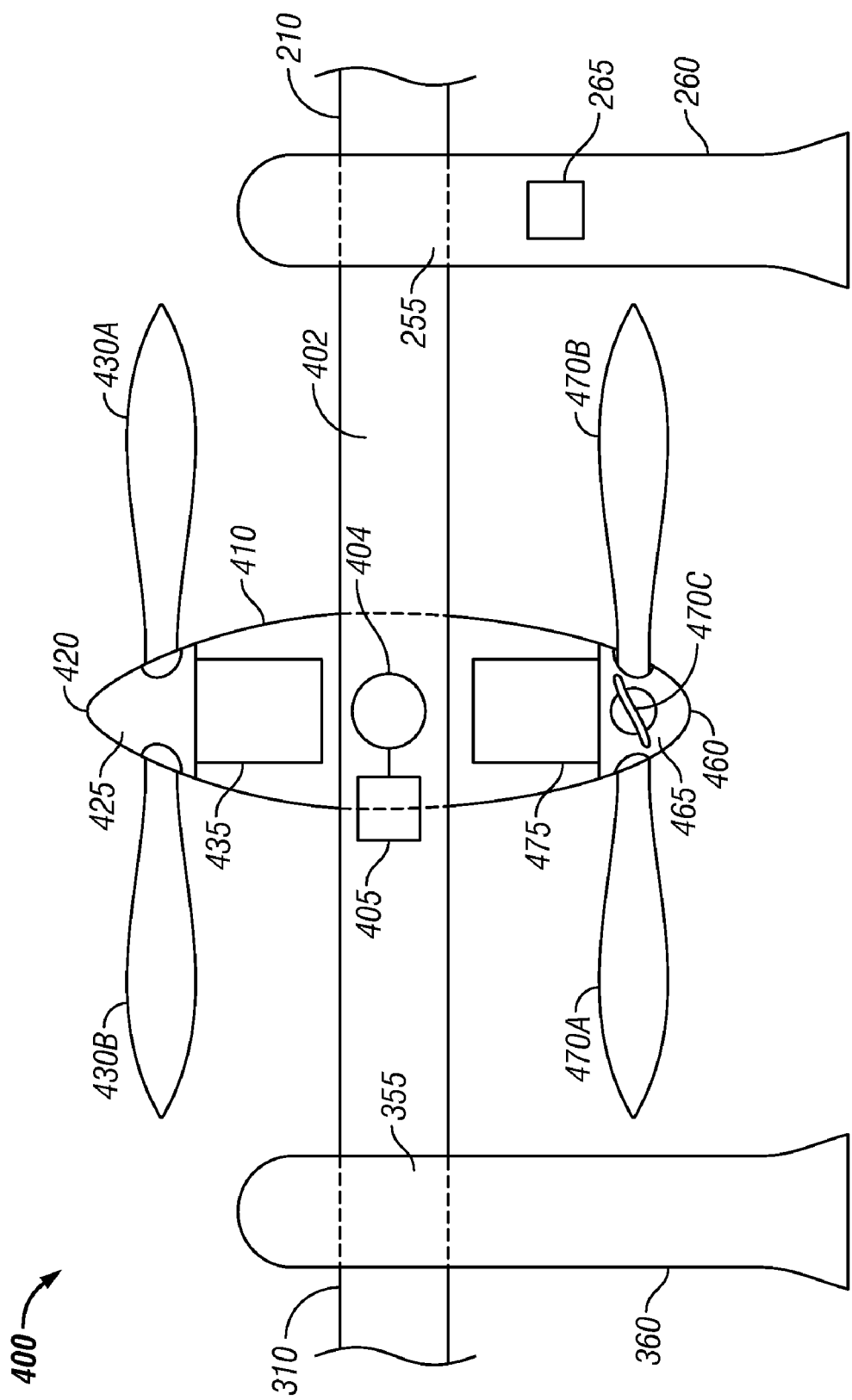
FIG. 5 is a top view of a engine nacelle attached through a pivot point to a support member on an additional embodiment of a tilt-rotor/tilt-propeller aircraft in horizontal flight mode.
Figure 6:
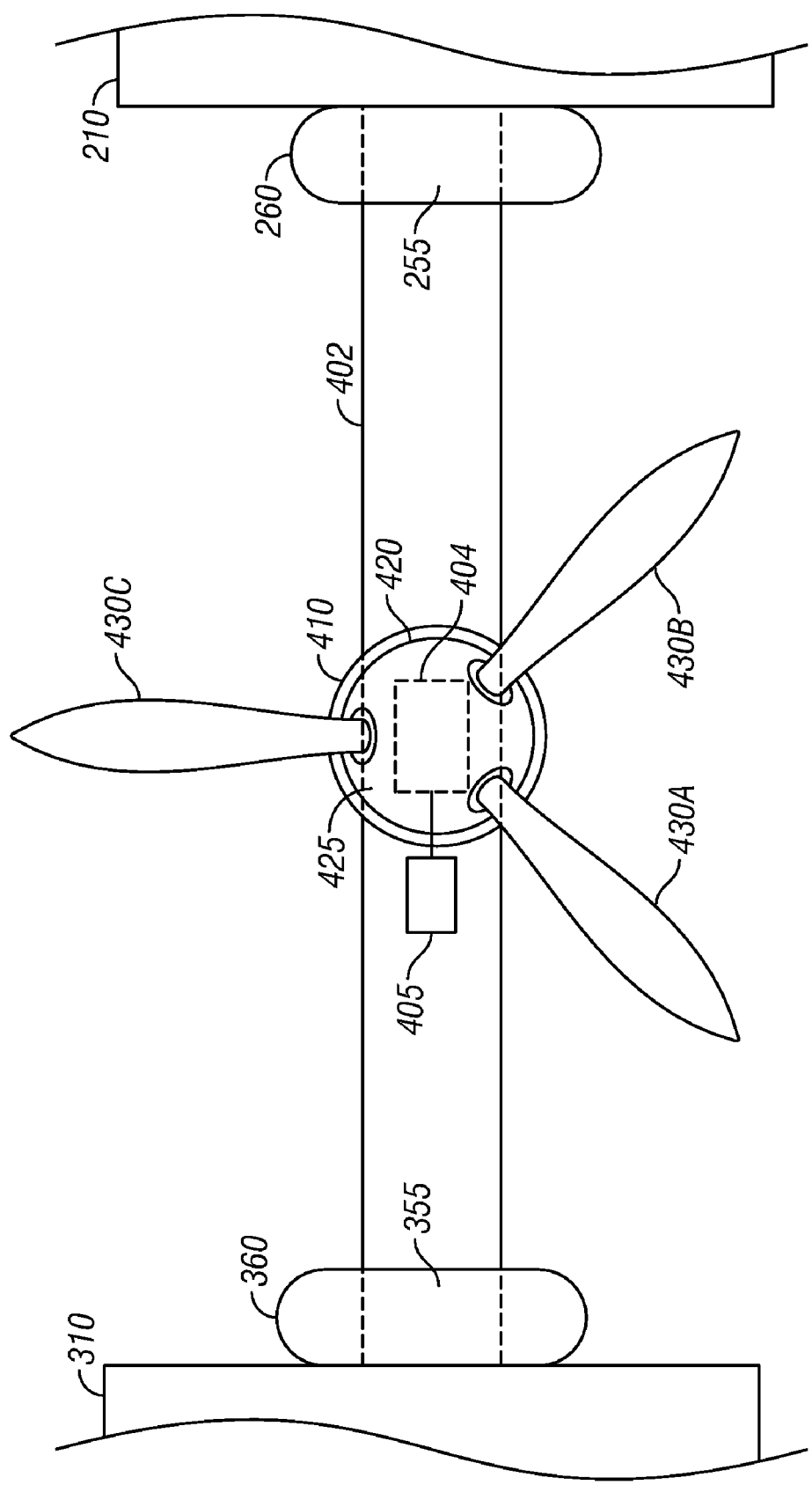
FIG. 6 is a rear view of a engine nacelle attached through a pivot point to a support member on the tilt-rotor/tilt-propeller aircraft of FIG. 5 in vertical hover mode.

FIGS. 5 and 6 show the rear and top view of the thrust assembly 400, respectively, in vertical hover mode, according to an alternative embodiment of a V/STOL aircraft. In this embodiment, one nacelle support spar 402 takes the place of the right and left nacelle support spars 250 and 350 on the V/STOL aircraft 100 discussed hereinabove in conjunction with FIGS. 1-4. The nacelle support spar 402 attaches to the two lateral pivot points 255 and 355. Further, the nacelle 410 attaches to the nacelle support spar 402 through a nacelle pivot point 404. A nacelle longitudinal rotator motor 405 operates to rotate the thrust assembly 400 about the longitudinal axis. Here, rotation of the thrust assembly 400 about the lateral axis through the two lateral pivot points 255 and 355 permits the thrust to be directed downward and to the rear to pitch the tilt-rotor aircraft 100 nose down, and downward and forward to pitch the V/STOL aircraft 100 nose up. In similar fashion, rotation of the thrust assembly 400 about the longitudinal axis through the nacelle pivot point 404 permits the thrust to be directed downward and to the left to roll the V/STOL aircraft 100 to the right, and downward and to the right to roll the V/STOL aircraft 100 to the left. This embodiment provides a simple mechanism for controlling pitch and roll of the V/STOL aircraft 100 without the need for a swashplate, i.e., in embodiments using propellers rather than rotors.

Figure 7:
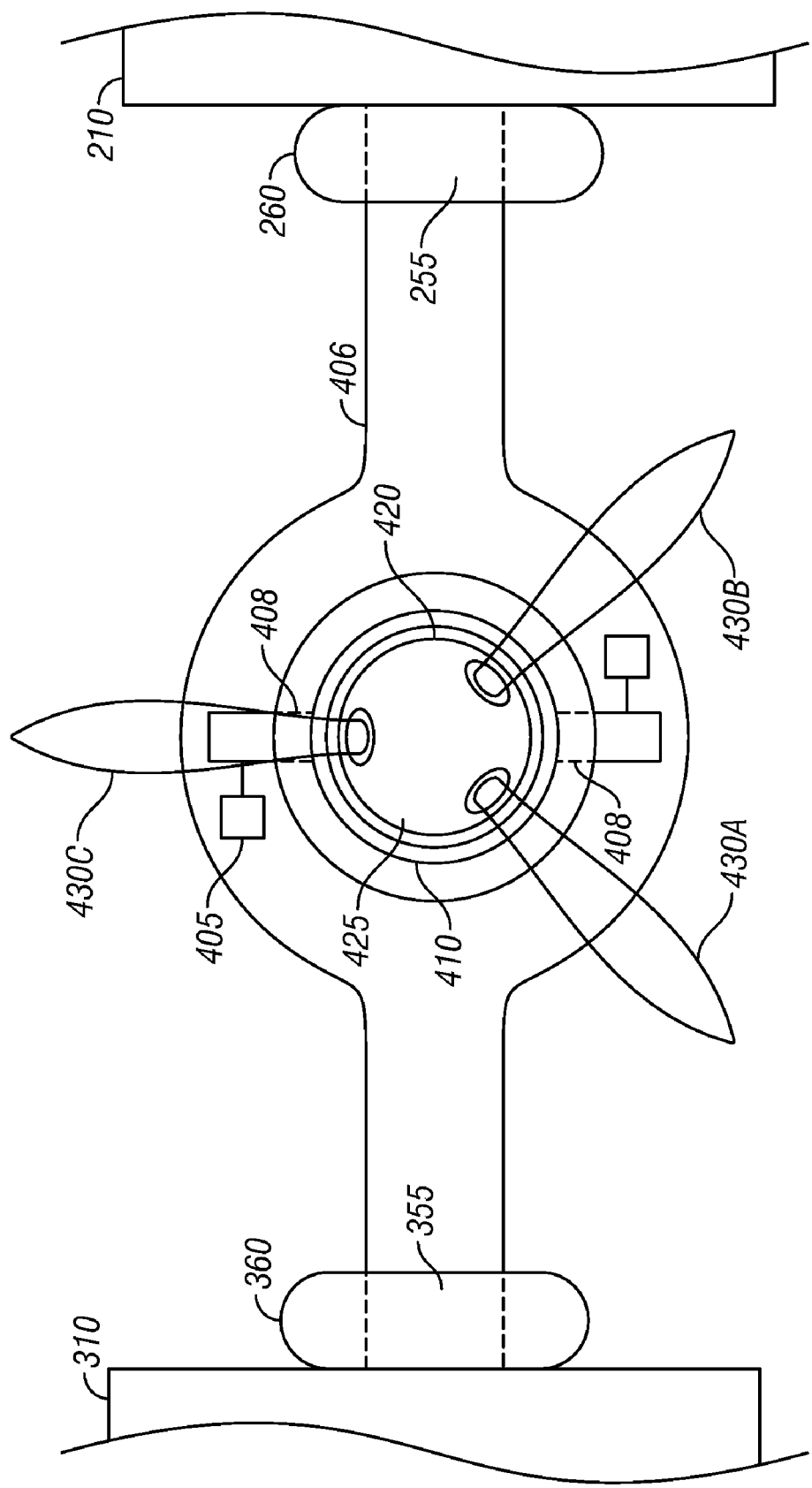
FIG. 7 is a top view of a engine nacelle gimbal mounted to a support yoke on another embodiment of a tilt-rotor/tilt-propeller aircraft in horizontal flight mode.

FIG. 7 shows the top view of the thrust assembly 400 in vertical hover mode, according to another embodiment of the present invention. Here, the nacelle support spar 402, is replaced with a nacelle support yoke 406, and the nacelle 410 attaches to the nacelle support yoke 406 through two pivot points 408. Here the pitch of the V/STOL aircraft 100 in vertical hover mode is through rotation of the thrust assembly 400 about the lateral axis, and roll of the tilt-rotor aircraft 100 in vertical hover mode is through rotation of the thrust assembly 400 about the longitudinal axis. Replacing the nacelle support spar 402 with the nacelle support yoke 406 more evenly distributes the forces generated on the components of the V/STOL aircraft 100.

The forward engine 435 and the aft engine 475 of the V/STOL aircraft 100 can be internal combustion engines or electric motors. Use of electric motors permits the use of an off the shelf electronic motor speed control module, resulting in a simple mechanism for yaw control. Further, use of electric motors results in quicker yaw response.

The V/STOL aircraft 100 is remote controlled in another embodiment of the invention. A remote control receiver 170 receives control inputs from a remote location to control aircraft function. In hover mode, the nacelle lateral rotator motor 265 rotates the thrust assembly 400 about the lateral axis to control pitch. The nacelle longitudinal rotator motor 405 rotates the thrust assembly 400 about the longitudinal axis for roll control. Where the engines are internal combustion engines, coordinated throttle controls permit yaw control, while use of electric motors permits electronic speed control for yaw control.

The V/STOL aircraft 100 includes an automatic flight control system 175 that will monitor angular position, velocity and acceleration around the pitch, roll and yaw axis, and apply corresponding first and second order corrections to nacelle pitch and roll actuators, in order to maintain a desired altitude, attitude and heading. A Global Positioning System (GPS) system is part of the input for these analyses.

Figure 8:
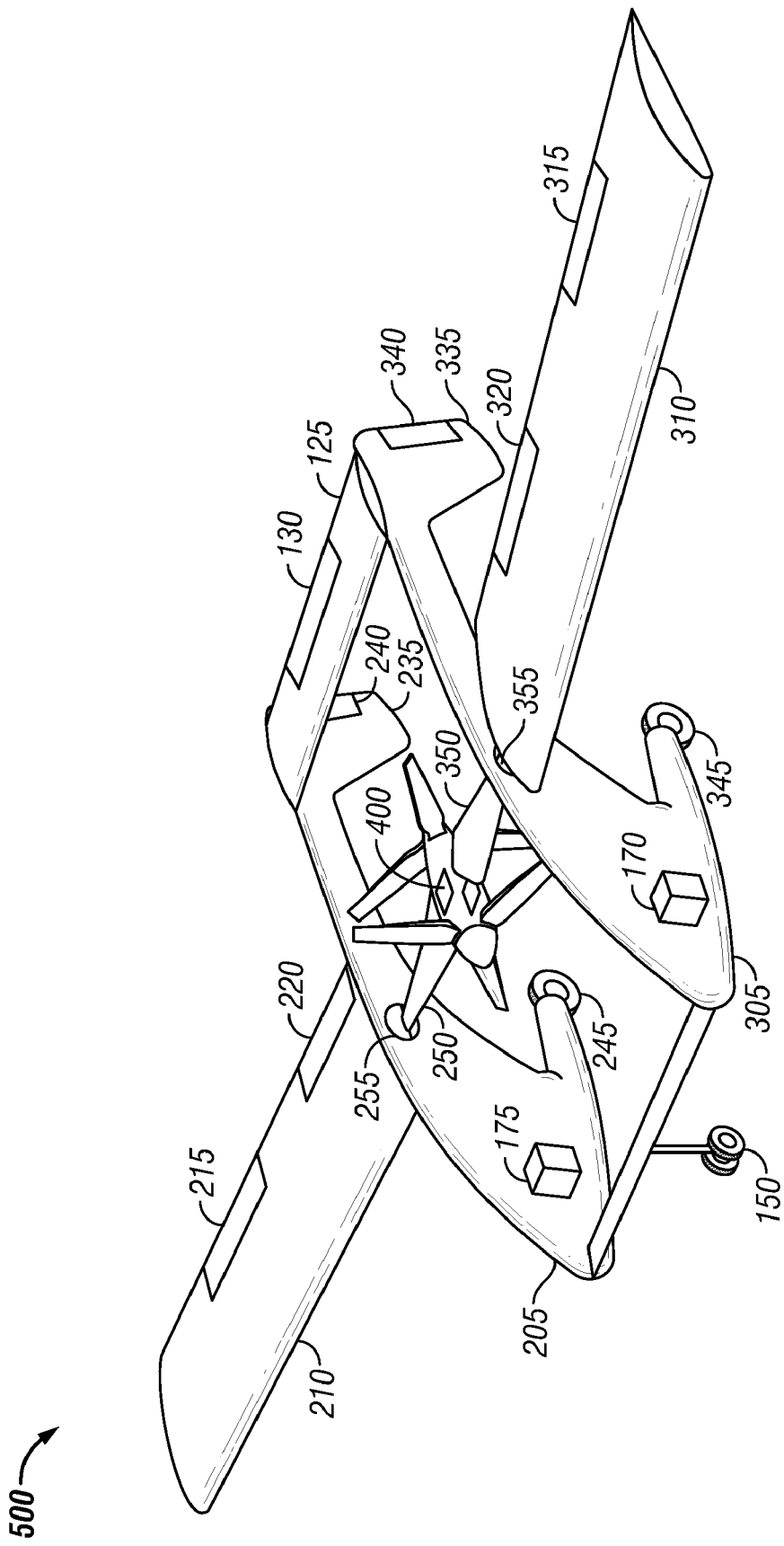
FIG. 8 is a perspective view of an alternative embodiment of a tilt-wing aircraft in horizontal flight mode.

FIG. 8 shows a perspective view of a tilt-wing aircraft 500 in horizontal flight mode according to another embodiment of the invention. Here, a right fuselage 205 and a left fuselage 305 permits simplified structure to support the functional elements of the present invention.

Figure 9:
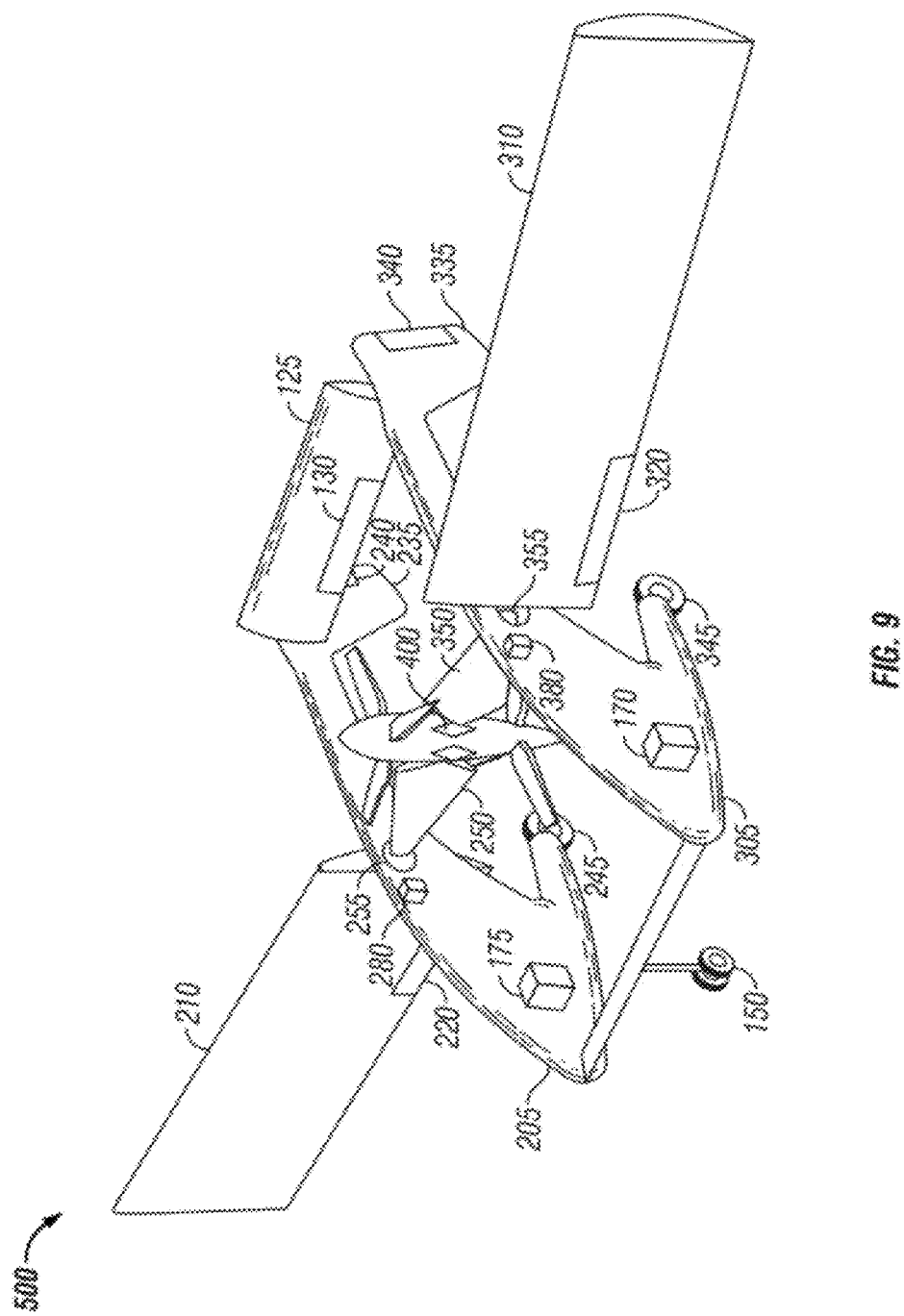
FIG. 9 is a perspective view of an embodiment of the tilt-wing aircraft of FIG. 8 in vertical hover mode.

FIG. 9 shows a perspective view of the V/STOL aircraft 500 of FIG. 8 in vertical hover. All of the aforementioned improvements are amenable to a tilt-wing type V/STOL aircraft. In horizontal flight mode, such a tilt-wing aircraft 600 utilizes separate actuators 280 and 380 for lateral rotation the wings 210 and 310. Here, the right actuator 280 rotates the right wing 210, and the left actuator 380 rotates the left wing 310, from substantially vertical positions to substantially horizontal for conversion from vertical hover mode to horizontal flight mode, and from substantially horizontal positions to substantially vertical positions for reconversion back to vertical hover mode. Additionally, with separate actuators 280 and 380 on each wing 210 and 310, roll may be controlled in horizontal flight mode by varying the relative pitch of the wings 210 and 310 with respect to each other, eliminating the need for ailerons.

From the foregoing it will be appreciated that the vertical/short take-off and landing aircraft provided by the invention provides a simplified mechanism for supplying power to the propellers, rotors, or proprotors and improving efficiency in horizontal flight mode. A vertical/short take-off and landing aircraft embodying the invention also simplifies flight controls in vertical hover mode. The simplified flight controls are adaptable to either piloted or unpiloted applications.

Although specific embodiments of the invention have been described and illustrated, the invention is not to be limited to the specific forms or arrangements of parts so described and illustrated. The invention is limited only by the claims.

I claim:

1. A vertical/short take-off and landing aircraft capable of in-flight conversion between a vertical hover mode and a horizontal flight mode comprising:
    a fuselage having a starboard side and a port side;
    a pair of wing sections each extending from each of the port and starboard sides of the fuselage;
    a thrust assembly attached between the wing sections and further affixed so as to be rotatable about a primarily lateral axis from a vertical position to a horizontal position during conversion between the vertical hover mode and the horizontal flight mode and from a horizontal position to a vertical position during reconversion between the horizontal flight mode and the vertical hover mode, the thrust assembly comprising:
    a first fan and a second fan;
    a first engine and a second engine;
    wherein the pair of fans are counter-rotating, and
    wherein the pair of engines are counter rotating, each engine having an output connected to one of the inline counter-rotating fans and not connected to the other of the inline counter rotating fans;
    wherein the fans and engines are positioned coaxially and inline such that the fist fan and second fan are located on opposite ends of the thrust assembly and the first engine and second engine such that the output of the first engine is connected to the first fan, and the second engine is connected to the second fan; and
    wherein the relative speed of the inline counter-rotating engines is controlled such that a difference in speed between the engines creates an imbalance in the torque produced by each engine and fan, the imbalance in the torque produced by each engine and fan being operative to control yaw of the vertical/short take-off and landing aircraft.

2. The vertical/short take-off and landing aircraft of claim 1, wherein the thrust assembly is mounted so as to be rotatable about the longitudinal axis of the vertical/short take-off and landing aircraft when the thrust assembly is in the vertical position such that:
rotation of the thrust assembly about the lateral axis provides a change in direction of the thrust to contain a longitudinal component, thereby permitting control of pitch of the vertical/short take-off and landing aircraft, and;
rotation of the thrust assembly about the longitudinal axis provides a change in direction of the thrust to contain a lateral component, thereby permitting control of roll of the vertical/short take-off and landing aircraft.

3. The vertical/short take-off and landing aircraft of claim 1, wherein one of the engines is turned off in horizontal flight mode.

4. The vertical/short take-off and landing aircraft of claim 1, further comprising;
flight controls for controlling the vertical/short take-off and landing aircraft pitch, roll and yaw, and;
an automatic feedback control mechanism for stabilizing flight characteristics of the vertical/short take-off and landing aircraft when in vertical hover mode.

5. The vertical/short take-off and landing aircraft of claim 1, wherein the engines are internal combustion engines.

6. The vertical/short take-off and landing aircraft of claim 1, wherein the engines are electric motors.

7. The vertical/short take-off and landing aircraft of claim 1, wherein the vertical/short take-off and landing aircraft further comprises a radio control receiver for receiving control signals from a remote control unit.

8. The vertical/short take-off and landing aircraft of claim 1, wherein the vertical/short take-off and landing aircraft wherein the vertical/short take-off and landing aircraft is of a tilt-rotor or tilt-propeller type.

9. The vertical/short take-off and landing aircraft of claim 1, wherein the vertical/short take-off and landing aircraft wherein the vertical/short take-off and landing aircraft is of a tilt-wing type.

10. A vertical/short take-off and landing aircraft capable of in-flight conversion between a vertical hover mode and a horizontal flight mode comprising:
two fuselages, each fuselage having an inboard side and an outboard side;
a wing section extending laterally from the outboard sides of the fuselages;
a thrust assembly attached between the inboard sides of the fuselages, the thrust assembly being further affixed so as to be rotatable about a lateral axis from a vertical position to a horizontal position during conversion between the vertical hover mode and the horizontal flight mode and from a horizontal position to a vertical position during reconversion between the horizontal flight mode and the vertical hover mode, the thrust assembly comprising;
a first fan and a second engine;
a first engine and a second engine;
wherein the pair of fans are counter-rotating, and
wherein the pair of engines are counter rotating, each engine having an output connected to one of the fans and not connected to the other of the fans;
wherein the fans and engines are positioned coaxially and inline such that the first fan and second fan are located on opposite ends of the thrust assembly and the first engine and second engine such that the output of the first engine is connected to the first fan, and the second engine is connected to the second fan; and
wherein the relative speed of the inline counter-rotating motors is controlled such that a difference in speed between the motors creates an imbalance in the torque produced by each motor, the imbalance in the torque produced by each motor being operative to control the yaw of the vertical/short take-off and landing aircraft.

11. The vertical/short take-off and landing aircraft of claim 10, wherein the thrust assembly is mounted so as to be rotatable about the longitudinal axis of the vertical/short take-off and landing aircraft when the thrust assembly is in the vertical position such that;
rotation of the thrust assembly about the lateral axis provides a change in direction of the thrust to contain a forward or backward component, thus permitting control of the pitch of the vertical/short take-off and landing aircraft, and;
rotation of the thrust assembly about the longitudinal axis provides a change in direction of the thrust to contain a left or right component, thus permitting control of the roll of the vertical/short take-off and landing aircraft.

12. The vertical/short take-off and landing aircraft of claim 10, wherein one of the inline counter-rotating engines is turned off in horizontal flight.

13. The vertical/short take-off and landing aircraft of claim 10, further comprising;
flight controls for controlling the vertical/short take-off and landing aircraft pitch, roll and yaw, and;
an automatic feedback control mechanism for stabilizing flight characteristics of the vertical/short take-off and landing aircraft when in vertical hover mode.

14. The vertical/short take-off and landing aircraft of claim 10, wherein the inline counter-rotating engines are electric motors.

15. The vertical/short take-off and landing aircraft of claim 10, wherein the vertical/short take-off and landing aircraft is a remote controlled aircraft.

16. The vertical/short take-off and landing aircraft capable of in-flight conversion between a vertical hover mode and a horizontal flight mode of claim 1, wherein the fans are propellers.

17. The vertical/short take-off and landing aircraft capable of in-flight conversion between a vertical hover mode and a horizontal flight mode of claim 1, wherein the fans are rotors with blade-pitch controlled using a swashplate.

18. The vertical/short take-off and landing aircraft capable of in-flight conversion between a vertical hover mode and a horizontal flight mode of claim 1, wherein at least one of the first fan or the second fan is connected directly to first or second engine, respectively.

19. The vertical/short take-off and landing aircraft capable of in-flight conversion between a vertical hover mode and a horizontal flight mode of claim 10, wherein the fans are propellers.

20. The vertical/short take-off and landing aircraft capable of in-flight conversion between a vertical hover mode and a horizontal flight mode of claim 10, wherein the fans are rotors with blade-pitch controlled using a swashplate.

21. The vertical/short take-off and landing aircraft capable of in-flight conversion between a vertical hover mode and a horizontal flight mode of claim 10, wherein at least one of the first fan or the second fan is connected directly to first or second engine, respectively.

* * * * *